United States Patent

[11] 3,582,980

[72] Inventor Peter Michael Marks
Warminster, Pa.
[21] Appl. No. 831,171
[22] Filed June 6, 1969
[45] Patented June 1, 1971
[73] Assignee Philco-Ford Corporation
Philadelphia, Pa.

[54] ELECTRONIC LAMP SEQUENCING CIRCUIT
7 Claims, 1 Drawing Fig.

[52] U.S. Cl. .................... 315/210, 307/293, 340/82
[51] Int. Cl. .................... H05b 37/00
[50] Field of Search .................... 307/293, 294; 315/210, 323; 340/82

[56] References Cited

UNITED STATES PATENTS 3,313,981 4/1967 Kratochvil .................... 315/210

*Primary Examiner*—Raymond F. Hossfeld
*Attorney*—Herbert Epstein

ABSTRACT: An electronic lamp-sequencing circuit, useful in automobile turn signal systems, in which a first lamp is energized by closure of a switch, and thereafter second and third lamps are energized in overlapping succession by a delay circuit comprising an astable multivibrator having two alternately conducting sides, and two output buffers with capacitively shunted input circuits which are respectively driven by different sides of the multivibrator. Closure of the switch activates the astable multivibrator and causes current to be supplied to the first lamp. Means are provided to cause a preselected first side of the multivibrator to conduct first, when the multivibrator is initially energized. Means responsive to such conduction prevent the capacitor of one of the two output buffers from charging, whereby no output is supplied from said buffer and the lamp associated with it does not light. By the time conduction of the multivibrator switches to the second side thereof, the capacitor of the other output buffer has charged, allowing this buffer to supply, in response to conduction of the second side, an output which turns on the second lamp. Thereafter, by the time conduction of the multivibrator again switches to the first side, the capacitor of said one buffer also has charged, allowing this buffer to turn on the third lamp.

PATENTED JUN 1 1971
3,582,980
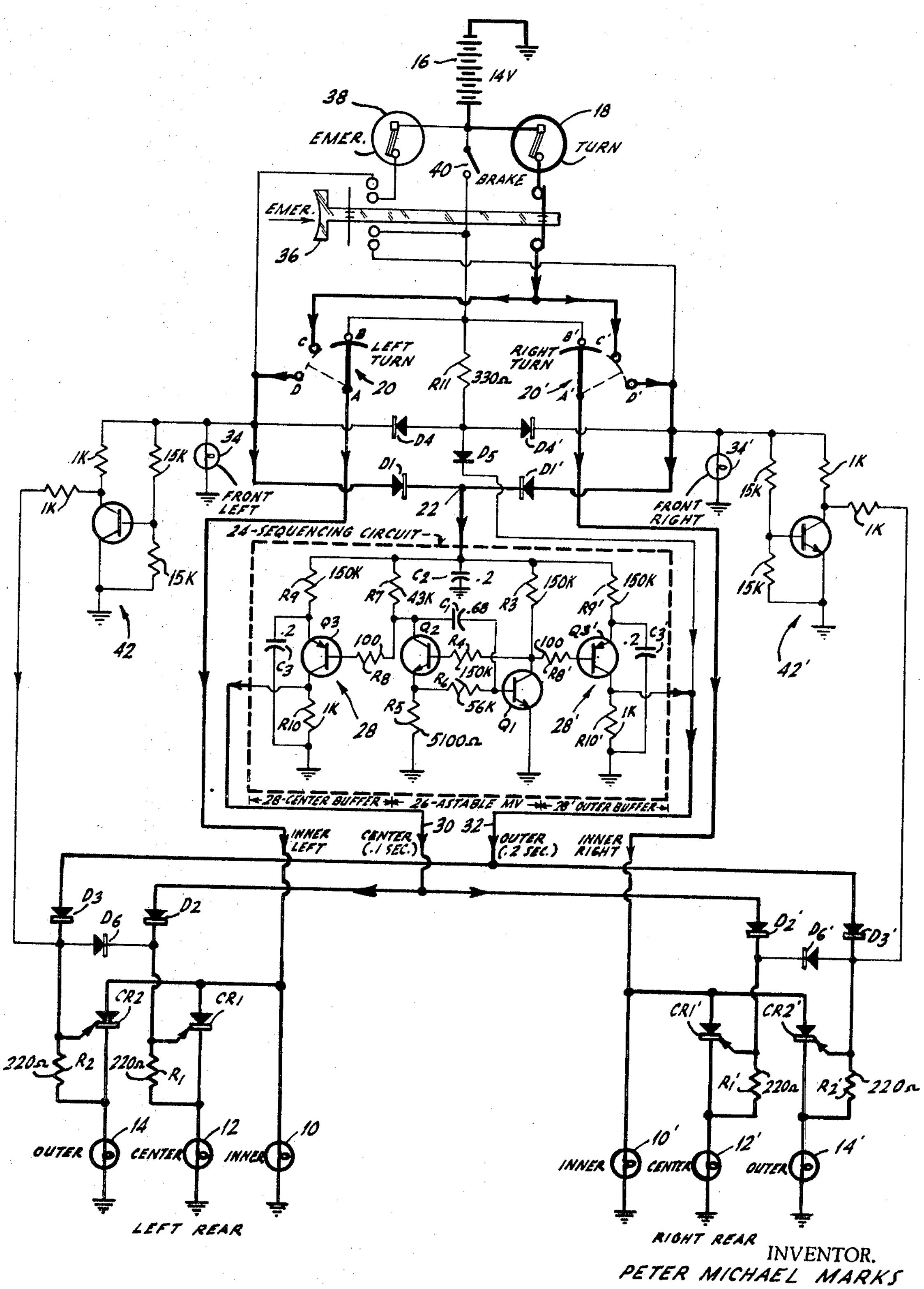
INVENTOR.
PETER MICHAEL MARKS
D. P. Bressman
ATTORNEY

ELECTRONIC LAMP SEQUENCING CIRCUIT

BACKGROUND OF THE INVENTION

Electronic lamp-sequencing circuits, which energize a plurality of lamps in succession, are useful in automobile turn signal indicators and other applications where it is desirable to indicate direction in a dynamic manner.

One prior art sequential automobile turn signal system utilizes two sets of three horizontally aligned rear mounted lamps (one set for each side) wherein each set of lamps is operated in sequence (inner, middle, then outer) by means of a motor-driven switch, the motor of which is actuated by the turn signal switch. However the use of a motor-driven switch to provide plural delays is undesirable from reliability and cost standpoints. It would be highly desirable, therefore, if the required delays could be provided by means of an electronic circuit employing semiconductors since these usually are more reliable and cost less than motor-driven switches.

SUMMARY OF THE INVENTION

Accordingly two objects of the present invention are to provide: (1) an improved electronic lamp-sequencing circuit, and (2) a lamp-sequencing circuit which is simple, reliable, and inexpensive. Other objects of the present invention are to provide: (3) a novel multivibrator circuit which can provide plural time delays, and (4) a plural time delay circuit employing the repetitive switching action of an astable multivibrator.

The plural time delay circuit of the invention comprises an astable multivibrator having two output terminals coupled respectively to two buffer stages. The astable multivibrator comprises first and second inverters cross-coupled in such manner that, upon energization of the multivibrator, the first inverter becomes conductive before the second inverter becomes conductive. The first inverter supplies to a first of the two output terminals one output signal when conductive and another output signal when nonconductive. Similarly, the second inverter supplies to the second output terminal one output signal when conductive and another output signal when nonconductive.

Each buffer stage comprises a transistor having emitter, collector and base electrodes, first resistive means having a third terminal connected to the emitter electrode and also having a fourth terminal, and second resistive means having a fifth terminal connected to the collector electrode and also having a sixth terminal, and capacitive means connected between the third and sixth terminals. First signal-coupling means couples the first output terminal of the multivibrator to the base electrode of the transistor of a first of the two buffer stages. Second signal-coupling means couples the second output terminal of the multivibrator to the base electrode of the transistor of the second buffer stage. Means are provided for simultaneously energizing the multivibrator and applying operating voltage between the fourth and sixth terminals of both buffer stages. The fifth terminal of each buffer stage is employed as an output terminal of the plural time delay circuit.

When the astable multivibrator is first energized and simultaneously operating voltage is applied to the two buffer stages, the first inverter conducts, producing said one output signal. The second inverter is nonconductive. That signal, coupled to the base of the transistor of the first buffer, forward-biases the base-emitter path of that transistor. However, no collector current flows therein because the first capacitive means, initially uncharged, holds the emitter and collector at nearly the same potential and because, for reasons discussed in detail hereinafter, that capacitor cannot charge to any significant extent so long as the base-emitter path of the transistor is forward-biased. Consequently, no output signal is produced at the fifth terminal of the first buffer during the initial conduction period of the first inverter. In addition no output signal is then produced at the fifth terminal of the second buffer because the second inverter of the multivibrator is nonconducting and its output signal (said other signal) inhibits conduction of the transistor of the second buffer.

When the astable multivibrator switches conduction states, so that the second inverter is conductive and the first inverter is nonconductive, the base-emitter path of the second buffer's transistor is forward-biased by said one signal supplied thereto. Moreover collector current flows in that transistor because, during the prior conduction of the first inverter, the second capacitive means has charged sufficiently to apply an appropriate operating bias between the emitter and collector of the second buffer's transistor. Consequently, an output signal is produced at the fifth terminal of the second buffer.

Thereafter, then the astable multivibrator again switches conduction states, the first inverter again supplies said one signal to the first buffer. This time, the first buffer produces an output signal at its fifth terminal because, during the immediately preceding period, when the first inverter was nonconductive and the base-emitter path of the first buffer's transistor was not forward-biased, the first capacitive means charged sufficiently to apply an appropriate operating bias between the emitter and collector of the first buffer's transistor.

Thus in accordance with the invention, the production of an output signal at either terminal of the time delay circuit is delayed for one conduction-state period of the multivibrator immediately following its energization, and thereafter output signals are produced at alternate ones of the two output terminals of the delay circuit each time the inverters of the multivibrator change conduction states.

The invention also relates to a circuit for sequencing the energization of three loads, e.g. lamps, in which means are provided for supplying an electrical signal to energize a first of those loads, and in addition delay means are provided for energizing the second and third of those loads in sequence after the inception of and in response to the electrical signal. In accordance with the invention, those delay means comprise the plural time delay circuit of the invention, described above.

Further objects and advantages of the present invention will be apparent from a consideration of the ensuing description thereof.

BRIEF DESCRIPTION OF THE DRAWING

The single-figure drawing shows a complete automobile lamp-signalling system, including sequential turn signals, emergency flasher, and brake light circuits. Exemplary component values are appropriately indicated; many other values are feasible. Elements illustrated in heavy lines or outlined in heavy broken lines constitute the sequential turn signal circuit described hereinafter in detail. Certain elements on the left side of the drawing have identical counterparts on the right side of the drawing: in these cases only the left-hand elements are described in detail; the right-hand elements are designated by means of corresponding but primed reference numerals.

DESCRIPTION OF THE PREFERRED EMBODIMENT

The left rear turn signal lamps which are sequentially operated are shown at 10, 12, and 14; similar lamps 10', 12', and 14' are provided for the right side. As indicated, lamp 10 is the inner lamp, lamp 12 is the center lamp, and lamp 14 is the outer lamp. The lamps are operated in this order with a 0.1 second delay between operation of adjacent lamps. An energizing battery is indicated at 16. One terminal of a conventional automobile turn signal flasher 18 is connected directly to the positive terminal of battery 16. Flasher 18 employs a bimetallic element for causing the turn signal circuit to open and close intermittently when a load (e.g., one or more lamps) is connected between the other terminal of the flasher and ground (the negative terminal of battery 16.)

A left turn signal switch 20, the pole of which may be mechanically coupled to the pole of right turn signal switch 20' is separately illustrated from the right turn switch for ease of explanation. Normally the poles of both turn signal switches are in the respective positions indicated in solid lines, in which terminal A is electrically connected to terminal B and terminal A' is connected to terminal B'. However when a turn is to be made, e.g., a left turn, the pole of switch 20 is rotated temporarily to the position indicated in dashed lines, in which terminals A and D are commonly connected to terminal C, which in turn is connected to the bottom terminal of flasher 18.

Terminals D and D' of turn signal switches 20 and 20' are connected via a pair of respective diodes D1 and D1' to a supply terminal 22 of an electronic sequencing circuit 24. Circuit 24 comprises an astable multivibrator 26 and a pair of identical output buffers 28 and 28' which have respective capacitive shunts C3 and C3'. The functions of those capacitive shunts are described hereinafter. An output lead 30 of buffer 28 drives the left and right center lamps 12 and 12', and an output lead 32 of buffer 28' drives the left and right outer lamps 14 and 14'.

Terminal A of left turn signal switch 20 is connected directly to left inner lamp 10, and to the left center and left outer lamps 12 and 14 via the cathode-anode circuits of two silicon-controlled rectifiers CR1 and CR2, respectively. Terminal A' of the right turn signal switch 20' is similarly connected to the right inner lamp 10' and to the right center and outer lamps 12' and 14' by CR1' and CR2', respectively. Output lead 30 of buffer 28 is connected to the gate electrodes of CR1 and CR1' by way of diodes D2 and D2', respectively, and output lead of buffer 28' is connected to the gate electrodes of CR2 and CR2' by way of diodes D3 and D3'. The gates of CR1 and CR2 are connected to their cathodes by biasing resistors R1 and R2, respectively, and similar biasing resistors R1' and R2' are provided for CR1' and CR2'.

Astable multivibrator 26 comprises a pair of cross-coupled inverters employing transistors Q1 and Q2, respectively. The emitter of Q1 is grounded; its collector is connected to supply terminal 22 by a load resistor R3 and to the base of Q2 by a resistor R4. The emitter of Q2 is connected to ground by a resistor R5 and to the base of Q1 by a resistor R6. The collector of Q2 is connected to terminal 22 by a load resistor R7 and to the base of Q1 by a capacitor C1. A capacitor C2 is connected between terminal 22 and ground to bypass transients appearing at terminal 22.

Buffer 28 comprises a transistor Q3 whose base is connected to the emitter of Q2 by a resistor R8. The collector of Q3 is connected to terminal 22 by a resistor R9 and to ground by a capacitor C3. Capacitor C3 is provided to maintain the emitter of transistor Q3 at substantially ground potential immediately after operating voltage is applied to circuit 24 by closure of switch 20 or switch 20', thereby to prevent transistor Q3 from being driven into conduction by a transient which may be produced upon such application of operating voltage. The collector of Q3 is connected directly to lead 30 and also to ground by a resistor R10. Buffer 28' is identical to buffer 28 except that the base of its transistor, Q3', is connected to the collector of Q1 by R8' and the collector of Q3' is connected directly to lead 32. Capacitor C3' serves two purposes - (1) maintaining the emitter of transistor Q3' at substantially ground potential immediately after operating voltage is applied to circuit 24, thereby to prevent transistor Q3' from being driven into conduction by the aforementioned transients, and (2) preventing flow of emitter-collector current in transistor Q3' during the first conduction period of transistor Q1 after closure of switch 20 or switch 20'.

The following elements do not form part of the sequencing circuit and hence will be described briefly. Their operation, which will be apparent to those skilled in the art from the following description, will not be described separately.

The front turn lamps 34 and 34' are operated directly from the D and D' terminals of switches 20 and 20'. An emergency flasher switch 36, which disconnects turn signal flasher 18 and connects an emergency flasher 38 in circuit, is provided for flashing both front lamps simultaneously and causing both sets of rear lights to sequence simultaneously. A brake switch 40, which is usually operated hydraulically as part of the service brake system, is provided for operating all six rear lights simultaneously. However when the turn signal switch is operated (e.g., left switch 20) substantially the full voltage of battery 16 will be supplied to circuit 42, thereby blocking the output of brake switch 40 from causing the two outer left rear lights 12 and 14 to be energized. Similarly if the emergency flasher switch 36 is operated, substantially the full voltage of battery 16 will be supplied to circuits 42 and 42', thereby blocking the output of brake switch 40 from causing the two outer rear lights on both sides to be energized. Associated with brake switch 40 are diodes D4, D4', D5, D6, and D6' and a resistor R11, which prevent sneak paths and provide the appropriate operating levels for circuits 42 and 42'.

OPERATION

When turn switch 20 is operated, current from battery 16 is supplied through flasher 18 directly to lamp 10 and also to sequencing circuit 24 via D1 and terminal 22. The current to circuit 24 is supplied to the base of Q1 via R7 and C1, and to the base of Q2 via R3 and R4. Since initially current flows more readily through the path R7, C1 than through the path R3, R4, more current initially is supplied to the base of Q1 than to the base of Q2, causing Q1 to turn on before Q2. As Q1 turns on, its collector potential falls to substantially ground potential, removing any positive potential at the base of Q2 and thereby preventing Q2 from conducting. In addition C1 begins to charge through R7 and the base-emitter circuit of Q1.

While C1 is charging, C3 of buffer 28 also charges through R9. Q3 cannot conduct however, since the collector potential of nonconductive Q2, applied via R8 as a bias to the base of Q3, is sufficiently more positive than the potential of the emitter of Q3 to maintain Q3 cut off. Because the collector of conducting transistor Q1 is substantially at ground potential and that collector potential is applied via R8' to the base of Q3', and because the emitter of Q3' concurrently is supplied from terminal 22 via resistor R9' with a potential more positive than ground potential, the emitter-base path of Q3' becomes forward-biased and consequently has a low resistance. However, very little collector current flows in Q3' because (1) initially capacitor C3' tends to maintain near ground potential, i.e., near the collector potential of Q3', the emitter potential of Q3' and (2) thereafter the emitter potential of Q3' remains near ground potential because most of the voltage between terminal 22 and ground is dropped across R9', whose resistance is much higher than that of the series circuit comprising the forward-biased emitter-base path of Q3', R8', and the collector-emitter path of conducting transistor Q1. Because the emitter potential of Q3' remains near ground, capacitor C3' remains practically uncharged. Viewed otherwise, both C3' and said series circuit receive current via the same resistor R9'. Because the series circuit offers much less opposition to the flow of current than does C3', most of the current flowing through R9' flows into the series circuit and only the small remaining amount of current is available to charge C3'. Hence the voltage across C3' does not increase substantially during the conduction of Q1 and therefore almost no collector current flows in Q3' during this conduction of Q1.

Because almost no current flows through the collector of Q3', and R10' connected in series therewith, lead 32 remains substantially at ground potential, and CR2, to whose gate electrode lead 32 is connected via D3, remains unactuated. Hence lamp 14 remains unlit.

As C1 becomes fully charged, the current flow therethrough falls toward zero. As a result Q1 is deprived of base current and therefore cuts off. Consequently the collector potential of Q1 rises toward the potential of point 22. Q2 is turned on by this rise in potential, which is applied over R4 to the base of Q2. When Q2 turns on, its collector potential falls; this fall in potential is transmitted via C1 to the base of Q1, thereby accelerating the turnoff of Q1.

By the time Q2 turns on, C3 will have been charged to an appreciable positive voltage, so that the low collector potential of Q2, applied through R8 to the base of Q3, is able to turn on Q3. When Q3 turns on, its collector potential and hence the potential of lead 30 rises to a positive value. This rise in potential is coupled through D2 to the gate electrode of Cr1, thereby turning on CR1 and enabling current to be supplied to center lamp 12. When the circuit components have the respective values indicated in the drawing, the circuit will turn on lamp 12 about 0.1 second after inner lamp 10 is turned on. During the time that Q3 is turned on, C3 discharges via R10 and the collector-emitter path of Q3.

Since Q2 is on and Q1 is off, Q3' also is off, the series circuit comprising the now reverse-biased emitter-base path of Q3', R8' and the now nonconductive emitter-collector path of Q1 presents a very high resistance to the flow of current, and therefore, C3' is now able to charge through R9'. Concurrently C1 will discharge through the collector-emitter circuit of Q2 and R6. As C1 discharges, the potential of the base of Q1 rises. When the potential at the base of Q1 has risen to a sufficient value, Q1 turns on again and Q2 turns off.

By this time C3' will have charged sufficiently to enable Q3' to turn on in response to the lowered collector potential of Q1 caused by the turning on of Q1. When Q3' turns on, the collector potential thereof rises, causing a positive voltage to appear on lead 32. This voltage, supplied through D3 to the gate of CR2, turns on CR2. As a result, outer lamp 14 is connected to battery 16. The aforedescribed operation of the circuit causes outer lamp 14 to turn on about 0.1 second after center lamp 12 turns on and about 0.2 second after inner lamp 10 turns on. During the time that Q3' is turned on, C3' discharges via R10' and the collector-emitter path of Q3'.

At the time that Q2 turns off and Q1 again turns on, Q3 is turned off by the increased potential at the collector of Q2. As a result the potential on lead 30 (and hence at the gate of CR1) drops to zero volts, but center lamp 12 remains on because CR1, having already fired, remains on until the potential at its anode is removed. Similarly, if after Q3' turns on, the multivibrator again switches (i.e., Q1 again turns off and Q2 again turns on), Q3' will turn off and the potential of lead 32 (and hence the gate of CR2) will drop to zero volts, but CR2 will remain conductive and outer lamp 14 will remain on.

After all three lamps 10, 12, and 14 have been lit, enough time will have elapsed for the bimetallic element in turn flasher 18 to heat sufficiently to cause it to open-circuit the flasher, thereby deenergizing lamp 10, sequencing circuit 24, CR1, and CR2. This will turn all three lamps 10, 12, and 14 off. In addition, following deenergization of sequencing circuit 24, the charged capacitors thereof are discharged. For example, if just before deenergization of circuit 24, C1 and C3' are charged, C3 has been discharged by conducting transistor Q3, Q1 and Q3' are nonconducting and Q2 is conducting, then upon such deenergization, the voltage across charged capacitor C1 maintains Q2 in conduction. As a result, C1 continues to discharge through R6 and the emitter-collector path of Q2 until the voltage across C1 has fallen to such a low value that Q2 ceases conduction. C3' concurrently discharges through the emitter-base path of Q3', R8', R4', the base-emitter path of Q2, and R5, and also discharges through R10' and the emitter-collector path of Q3'.

Alternatively if just before deenergization of circuit 24, capacitors C1 and C3' are discharged, capacitor C3 is charged, transistors Q1 and Q3' are conducting, and transistors Q2 and Q3 are nonconducting, then upon such deenergization, the base-emitter path of Q3 becomes forward-biased and C3 discharges through the emitter-base path of Q3, R8, C1 and the base-emitter path of Q1. When the emitter-base path of Q3 is thus forward-biased, the emitter-collector path of Q3 also becomes conductive, thereby providing an additional discharge path for C3 via R10 and the emitter-collector path of Q3.

Thereafter, the bimetallic element in flasher 18 will cool, reestablishing a conductive path through flasher 18 and once again supplying potential to lamp 10 and sequencing circuit 24. Thus the above-described sequence of events will repeat until the pole of turn switch 20 is returned to its original position, i.e. closed to contact B.

When right turn switch 20' is operated, the right rear lamps 10', 12', and 14' will be sequenced by similar operation of the sequencing circuit.

From the foregoing it can be seen that the lamp-sequencing circuit of the present invention is simple, reliable, and economical. The two required time delays are provided by an astable multivibrator requiring no moving parts and capable of miniaturization through use of integrated circuit techniques, rather than by mechanical means which contain moving parts subject to wear and which cannot readily be miniaturized.

I claim:

1. In combination:

a. an astable multivibrator comprising first and second inverters, and means for cross-coupling said inverters and for causing said first inverter, upon energization of said multivibrator, to become conductive before said second inverter becomes conductive, said first inverter supplying to a first output terminal one output signal when said first inverter is conductive and another output signal when said first inverter is nonconductive, said second inverter supplying to a second output terminal one output signal when said second inverter is conductive and another output signal when said second inverter is nonconductive, b. a first buffer stage comprising a first transistor having an emitter electrode, a base electrode and a collector electrode, first resistive means having a third terminal connected to said emitter electrode and also having a fourth terminal, second resistive means having a fifth terminal connected to said collector electrode and also having a sixth terminal, first capacitive means connected between said third terminal and said sixth terminal, and first signal coupling means coupling said first output terminal of said multivibrator to said base electrode, c. a second buffer stage comprising a second transistor having an emitter electrode, a base electrode and a collector electrode, third resistive means having a seventh terminal connected to said emitter electrode of said second transistor and also having an eighth terminal, fourth resistive means having a ninth terminal connected to said collector electrode of said second transistor and also having a tenth terminal, second capacitive means connected between said seventh terminal and said tenth terminal, and second signal coupling means coupling said second output terminal of said multivibrator to said base electrode of said second transistor, and d. means for simultaneously energizing said multivibrator, applying an operating voltage between said fourth and sixth terminals, and applying an operating voltage between said eighth and tenth terminals, said fifth terminal being an output terminal of said first buffer stage, said ninth terminal being an output terminal of said second buffer stage, said first buffer stage producing an output is final at said fifth terminal only in response to said one output signal of said first inverter and only when said first capacitive means is charged, and said second buffer stage producing an output signal at said ninth terminal only in response to said one output signal of said second inverter and only when said second capacitive means is charged.

2. The combination of claim 1 wherein each of said inverters said multivibrator comprises a transistor having an emitter connected to a terminal at reference potential and a collector connected to a load resistor, the collector of said transistor of said second inverter being capacitively coupled to the base of said transistor of first inverter, the collector of said transistor of said first inverter being resistively coupled to the base of said transistor of said second inverter.

3. The combination of claim 1 further including means for indicating the production of said output signal by said first buffer stage and means for indicating the production of said output signal by said second buffer stage.

4. In a circuit for sequencing the energization of a plurality of lamps, said circuit comprising three lamps, means for supplying a voltage to energize a first of said lamps, and delay means for energizing the second of said lamps and the third of said lamps in sequence after the inception of and in response to said voltage, the improvement wherein said delay means comprises:

a. an astable multivibrator comprising first and second inverters, and means for cross-coupling said inverters and for causing said first inverter, upon energization of said multivibrator by said voltage, to become conductive before said second inverter becomes conductive, said first inverter supplying to a first output terminal one output signal when said first inverter is conductive and another output signal when said first inverter is nonconductive, said second inverter supplying to a second output terminal one output signal when said second inverter is conductive and another output signal when said second inverter is nonconductive, b. a first buffer stage comprising a first transistor having an emitter electrode, a base electrode and a collector electrode, first resistive means having a third terminal connected to said emitter electrode and also having a fourth terminal, second resistive means having a fifth terminal connected to said collector electrode and also having a sixth terminal, first capacitive means connected between said third terminal and said sixth terminal, and first signal coupling means coupling said first output terminal of said multivibrator to said base electrode, c. a second buffer stage comprising a second transistor having an emitter electrode, a base electrode and a collector electrode, third resistive means having a seventh terminal connected to said emitter electrode of said second transistor and also having an eighth terminal, fourth resistive means having a ninth terminal connected to said collector electrode of said second transistor and also having a tenth terminal, second capacitive means connected between said seventh terminal and said tenth terminal, and second signal-coupling means coupling said second output terminal of said multivibrator to said base electrode of said second transistor, d. means for simultaneously supplying said voltage to said multivibrator and for applying said voltage as an operating bias between said fourth and sixth terminals of said first buffer stage and between said eighth and tenth terminals of said second buffer stage, said fifth terminal being an output terminal of said first buffer stage, said ninth terminal being an output terminal of said second buffer stage, said first buffer stage producing an output signal at said fifth terminal only in response to said one output signal of said first inverter and only when said first capacitive means is charged, and said second buffer stage producing an output signal at said ninth terminal only in response to said one output signal of said second inverter and only when said second capacitive means is charged, e. means supplied with and responsive to said output signal of said second buffer stage to energize said second lamp, and f. means supplied with and responsive to said output signal of said first buffer stage to energize said third lamp.

5. A circuit according to claim 4 wherein said means for supplying said voltage is connected to said second and third lamps by the cathode-anode circuits of first and second controlled rectifiers, respectively, said output signals of said first and second buffer stages being supplied to the control electrodes of said second and first controlled rectifiers, respectively.

6. A circuit according to claim 4 wherein the output of the second of said inverters of said multivibrator is capacitively coupled to the input of the first of said inverters and the output of the first of said inverters is direct-current coupled to the input of the second of said inverters.

7. A circuit according to claim 4 wherein said first inverter comprises a third transistor of one conductivity type whose collector is connected to said means for supplying said voltage by fifth resistive means and whose emitter is connected to a point at reference potential, said second inverter comprises a fourth transistor of said one conductivity type whose collector is connected to said means for supplying said voltage by sixth resistive means and to the base of said third transistor by third capacitive means, whose emitter is connected to said point at reference potential by seventh resistive means and to the base of said third transistor by eighth resistive means, and whose base is connected to the collector of said third transistor by ninth resistive means, said first and second transistors of said first and second buffer stages being of a conductivity type opposite said one conductive type, said sixth and tenth terminals of said first and second buffer stages, respectively, being connected to said point at reference potential, and said first and second signal-coupling means each comprising resistive means, directly coupling said first and second output terminals of said multivibrator to said base electrodes of said first and second transistors, respectively.